United States Patent [19]
Clapp

[11] Patent Number: 5,943,248
[45] Date of Patent: Aug. 24, 1999

[54] W-BIT NON-LINEAR COMBINER FOR PSEUDO-RANDOM NUMBER GENERATION

[75] Inventor: Craig S.K. Clapp, Boxford, Mass.

[73] Assignee: PictureTel Corporation, Andover, Mass.

[21] Appl. No.: 08/914,668

[22] Filed: Aug. 18, 1997

[51] Int. Cl.[6] .............................. G06F 1/02; G06F 1/03
[52] U.S. Cl. .............................. 364/718.01; 364/717.01; 364/716.06
[58] Field of Search ................. 364/717.01, 718.01, 364/718.03, 716.06; 341/173, 187; 327/164; 380/46

[56] References Cited

U.S. PATENT DOCUMENTS

| | | | |
|---|---|---|---|
| 4,748,576 | 5/1988 | Beker et al. ........................ | 364/717.01 |
| 4,965,881 | 10/1990 | Dilley ................................. | 380/50 |
| 5,506,797 | 4/1996 | Koshiba ............................. | 364/718.03 |
| 5,596,516 | 1/1997 | Higashi et al. .................... | 364/717.01 |
| 5,608,801 | 3/1997 | Aiello et al. ...................... | 380/46 |

Primary Examiner—Hassan Kizou
Assistant Examiner—Douglas S. Lee
Attorney, Agent, or Firm—Fish & Richardson P.C.

[57] ABSTRACT

A finite state machine for producing a stream of pseudo-random numbers, having characteristic positive integral values S and T. The finite state machine has a w-bit non-linear combiner having an input and an output, a plurality of w-bit registers including at least a chained series of S registers and a chained series of T registers. The non-linear combiner receives as the input data from the last of the chained series of S registers and from the last of the chained series of T registers. The first of the chained series of T registers receives input from the last of the chained series of S registers. The first of the chained series of S registers receives input from the output of the non-linear combiner.

36 Claims, 16 Drawing Sheets

Contents of registers $R_A$ through $R_D$ for time interval T0 to T4

|  | T0 | T1 | T2 | T3 | T4 |
|---|---|---|---|---|---|
| $R_A$ | R0 | R3' | R2' | R1' | R0' |
| $R_B$ | R1 | R0 | R3' | R2' | R1' |
| $R_C$ | R2 | R1 | R0 | R3' | R2' |
| $R_D$ | R3 | R2 | R1 | R0 | R3' |
| $M_{out}$ | R3' | R2' | R1' | R0' | R3" |
| Output | YES | NO | NO | NO | YES |

Parallel and serial forms of four-stage WAKE-ROFB

Figure 2B

Contents of registers $R_A$ through $R_E$ for time interval T0 to T5

|  | T0 | T1 | T2 | T3 | T4 | T5 |
|---|---|---|---|---|---|---|
| $R_A$ | R0 | R4' | R3' | R2' | R1' | R0' |
| $R_B$ | R1 | R0 | R4' | R3' | R2' | R1' |
| $R_C$ | R2 | R1 | R0 | R4' | R3' | R2' |
| $R_D$ | R3 | R2 | R1 | R0 | R4' | R3' |
| $R_E$ | R4 | R3 | R2 | R1 | R0 | R4' |
| $M_{out}$ | R4' | R3' | R2' | R1' | R0' | R4'' |
| Output | YES | NO | NO | NO | NO | YES |

<u>Parallel and serial forms of five-stage WAKE-ROFB</u>

Figure 3B

Contents of register $R_A$ through $R_E$ for time intervals T0 to T8

| | T0 | T1 | T2 | T3 | T4 | T5 | T6 | T7 | T8 |
|---|---|---|---|---|---|---|---|---|---|
| $R_A$ | R1 | R0',R4'' | R3' | R2' | R1' | R0'',R4''' | R3'' | R2'' | R1'' |
| $R_B$ | R2 | R1 | R0',R4'' | R3' | R2' | R1' | R0'',R4''' | R3'' | R2'' |
| $R_C$ | R3 | R2 | R1 | R0',R4'' | R3' | R2' | R1' | R0'',R4''' | R3'' |
| $R_D$ | R4 | R3 | R2 | R1 | R0',R4'' | R3' | R2' | R1' | R0',R4''' |
| $R_E$ | R0,R4' | R0,R4' | R0,R4' | R0,R4' | R0',R4'' | R0',R4'' | R0',R4'' | R0',R4'' | R0'',R4''' |
| Control | Hold | Hold | Hold | Load | Hold | Hold | Hold | Load | Hold |
| Select | $R_C$ | $R_C$ | $R_C$ | $R_E$ | $R_C$ | $R_C$ | $R_C$ | $R_E$ | $R_C$ |
| $M_{out}$ | R0',R4'' | R3' | R2' | R1' | R0'',R4''' | R3'' | R2'' | R1'' | R0''',R4'''' |
| Output | NO | YES | NO | NO | NO | YES | NO | NO | NO |

Parallel and serial forms of $WiderWake_{4+1}$

Figure 4B

Performance characteristics of selected variants of 32-bit WAKE-ROFB

| Model | Serial state-machine sub-sample ratio | Total state (bits) | Iterations of mixing function between outputs | Speed of word-serial hardware (bits/cycle) | Maximum parallelism or pipeline depth | Relative speed on serial CPU | Relative speed on 2-way parallel CPU | Relative speed on 3-way parallel CPU | Relative speed on 4-way parallel CPU |
|---|---|---|---|---|---|---|---|---|---|
| 4-stage | 4 | 128 | 4 | 8 | 3 | 1x(ref) | 2x | 3x | 3x |
| 5-stage | 5 | 160 | 5 | 6.4 | 4 | 0.8x | 1.6x | 2.4x | 3.2x |
| 4-stage | 5 | 128 | 5 | 6.4 | 3 | 0.8x | 1.6x | 2.4x | 2.4x |
| 4-stage | 6 | 128 | 6 | 5.33 | 3 | 0.66x | 1.33x | 2x | 2x |
| 5-stage | 6 | 160 | 6 | 5.33 | 4 | 0.66x | 1.33x | 2x | 2.66x |
| 4-stage | 8 | 128 | 8 | 4 | 3 | 0.5x | 1x | 1.5x | 1.5x |
| 5-stage | 8 | 160 | 8 | 4 | 4 | 0.5x | 1x | 1.5x | 2x |
| 3-stage | 4 | 96 | 4 | 8 | 2 | 1x | 2x | 2x | 2x |

Figure 9

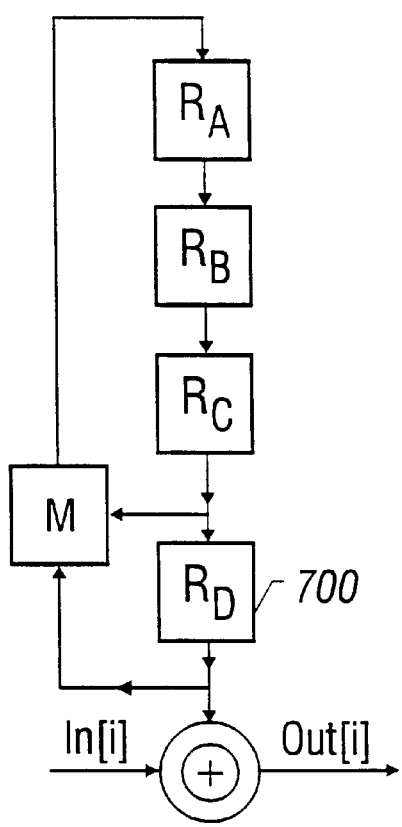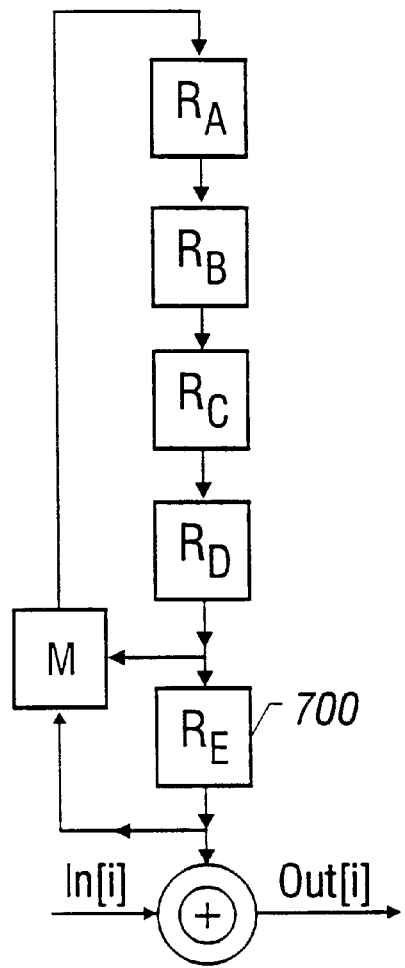
Figure 10A                    Figure 10B n-stage WAKE-ROFB, serial form, showing ability to pipeline Non-Linear Combiner

W-BIT NON-LINEAR COMBINER FOR PSEUDO-RANDOM NUMBER GENERATION

BACKGROUND OF THE INVENTION

The invention relates generally to pseudo-random number generation and more particularly to pseudo-random number generators operating efficiently in software and having efficient hardware implementations, for generating enciphered data streams.

When a pseudo-random sequence is used as a stream cipher for encryption, the same sequence must be generated to decrypt the data stream as was used to encrypt it. In the case where the encrypted data is being passed between two devices, both the sending device and the receiving device must be capable of creating identical pseudo-random sequences. In some applications, it occurs that one of the communicating devices is a general-purpose computer while the other includes a piece of special purpose hardware for generating pseudo-random sequences. In such circumstances, it is desirable that identical pseudo-random sequences can be generated efficiently both in hardware and in software implementations.

One such example application is the transmittal of copyright-protected digital video streams between a consumer electronics playback device, such as a digital video disk (DVD) player, and a personal computer, wherein the data is encrypted in transit between the two devices in order to protect it from unauthorized copying. The encryption function is desirably performed without significant cost impact on the consumer electronics device, and without undue computational burden on the personal computer. In particular, digital video streams are typically transmitted in a compressed format, and a personal computer may need almost all of its computational power simply to perform the decompression operation. An acceptable hardware cost for such an application may be as little as 1000 to 2000 gates, while the required throughput in software may be in excess of two bits per cycle on a general purpose computer.

A class of pseudo-random generators that achieve exceptional performance in software, in part through efficiently exploiting instruction-level parallelism in processors, is described in my co-pending provisional application No. 60/037,746, filed on Jan. 17, 1997 and assigned to the present assignee, the contents of which are incorporated herein by reference. These generators are pseudo-random non-linear state machines constructed from two component types: non-linear w-bit mixing functions, and w-bit registers, where for efficiency of implementation in software, w can be chosen to be the native word-length of the datapaths of the target processors.

As described in my co-pending application, in typical software embodiments suited for 32-bit processors, and referring to FIG. 1a, these generators have four 32-bit mixing functions 10 and four or five 32-bit registers 20. In a straightforward hardware implementation of such a generator, each mixing function would be implemented by a non-linear combiner consisting of a 32-bit adder, an array of thirty-two 2-input exclusive-OR gates, and a look-up-table of 256 entries each of 32 bits. If one bit of memory is counted as being equivalent to one logic gate, then a single non-linear combiner alone uses substantially more than 8000 gates. Taking all the non-linear combiners and associated registers together, the accumulated gate count for a generator is on the order of 40,000 gates.

It is therefore an object of the invention to provide a hardware efficient pseudo-random number generator capable of emulating a pseudo-random number generator adapted for efficient implementation in software on a processor capable of instruction-level parallelism. In particular, it is an object of the invention to provide such a generator having a minimal number of non-linear combiners, and to provide a non-linear combiner using a reduced amount of lookup table memory.

SUMMARY OF THE INVENTION

In one aspect, the present provides a finite state machine for producing a stream of pseudo-random numbers, having characteristic values S and T, comprising a w-bit non-linear combiner having an input and an output and a plurality of w-bit registers including at least a chained series of S registers and a chained series of T registers. The non-linear combiner receives as the input data from the last of the chained series of S registers and from the last of the chained series of T registers. The first of the chained series of T registers receives input from the last of the chained series of S registers. The first of the chained series of S registers receives input from the output of the non-linear combiner.

In another aspect, the present invention provides a finite state machine for producing a stream of pseudo-random numbers comprising a w-bit non-linear combiner a plurality of w-bit registers including at least a first register, and a chained series of one or more second registers, a selector responsive to a selector signal; and a selectively loaded register responsive to a load/hold signal. The non-linear combiner receives as an input data from the first register and from the selector. The first register receives as an input data from the selector. The selector receives as inputs the output of the selective loading register and the output of the last of the chained series of second registers and selects between the output of the selectively loaded register and the output of the last of the chained series of second registers in response to the selector signal. The first of the chained series of second registers receives input from the output of the non-linear combiner. The selectively loaded register, in response to the load/hold signal, selectively receives input from the output of the last of the chained series of one or more registers.

In another aspect, the present invention provides a method for generating a stream of pseudo-random numbers having positive integral characteristic values S and T such that GCD(S,T)=1. The values of the last of a chained series of S registers and the last of a chained series of T registers are combined using a non-linear combiner. The value of each register in the chained series of T registers are shifted into the successive register in the series. The value of each register in the chained series of S registers is shifted into the successive register in the chained series, except that the value of the final register in the chained series is shifted into the first register in the chained series of T registers. The value of the first register in the chained series of S registers is replaced with the output of the non-linear combiner. Pseudo-random numbers are read from one of the registers or from the output of the non-linear combiner. The above steps are repeated.

In another aspect, the present invention provides a method for generating a stream of pseudo-random numbers, the method having characteristic non-zero integral values S and T, such that GCD(S,T)=1. The step of combining a first and a second input value with a non-linear combiner is repeated, over a series of time steps, such that in a steady state, at any time step, the first input value is the output of the non-linear combiner at S+T time steps prior to the current time step, and the second input value is the output of the non-linear combiner at T time steps prior to the current time step.

In another aspect, the present invention provides a method for generating a stream of pseudo-random numbers, the method having an integral characteristic value n greater than 1. The step of combining a first and a second input value with a non-linear combiner is repeated over a series of time steps. In a steady state, for every series of n time steps, there are two successive time steps such that on the first successive time step the first input value is the output of the non-linear combiner at n time steps prior to the current time step and the second input value is the output of the non-linear combiner at 2n time steps prior to the current time step, and such that on the second successive time step, the first input value is the output of the non-linear combiner at n−1 time steps prior to the current time step and the second input value is the output of the non-linear combiner at 2n time steps prior to the current time step. On the remaining time steps of the series of n time steps the first input value is the output of the non-linear combiner at n−1 time steps prior to the current time step, and the second input value is the output of the non-linear combiner at n time steps prior to the current time step.

In another aspect, the present invention provides a w-bit non-linear combiner having characteristic non-zero integral values i, j, a, and b, where a+b=w, and a>=i and b>=j, having an input and an output, and comprising at least one lookup table, a first combiner having two w-bit inputs and one w-bit output and implementing an invertible function, a second combiner having two w−i−j bit inputs and one w−i−j bit output and implementing an invertible function, and an unbiased combiner having an a−i bit input and a b−j bit input and a w−i−j bit output. There is a lookup table having at least i bits of address space. There is a lookup table having at least j bits of address space. The first combiner combines a first and a second w-bit words from the input of the non-linear combiner. The i+j least or most significant bits of the output of the first combiner address the lookup tables. a−i bits of a first table output value, determined by i lookup table address bits, are combined by the unbiased combiner with b−j bits of a second table output value, determined by j distinct lookup table address bits, to produce w−i−j bits of output. The w−i−j bits of output from the unbiased combiner are combined by the second combiner with w−i−j bits from the output of the first combiner which are not used to address a lookup table. An arrangement of the i output table bits from the first table output value and the j output table bits from the second table output value which are not combined by the unbiased combiner, form either the i+j least or i+j most significant bits of the output of the non-linear combiner such that if the most significant bits of the output of the first combiner address the lookup tables the arrangement forms the least significant bits of the output of the non-linear combiner, and otherwise they form the most significant bits of the output of the non-linear combiner. The remaining output bits of the non-linear combiner are formed by the output bits of the second combiner. The function implemented by the first combiner is not linear over the same domain as the function implemented by the second combiner.

In another aspect, the invention provides a non-linear combining method having characteristic non-zero integral values i, j, a, b, and w, where a+b=w, and a>=i and b>=j. First and second w-bit words are combined into a third w-bit word using a first invertible function. A first table output word and a second table output word are generated, having lengths a and b respectively, by looking up lookup table entries using a first i+j bit word consisting of the i+j least or most significant bits of the third w-bit word, so that i bits of the first i+j bit word are used to look up the first table output word and j distinct bits of the first i+j bit word are used to look up the second table output word. a−i bits of the first table output word and b−j bits of the second table output word are combined with an unbiased combining function to produce a first w−i−j bit word. The w−i−j bit word and the w−i−j bits of the third w-bit word not used to look up table output words are combined using a second invertible function that is not linear over the same domain as the first invertible function, to produce a second w−i−j bit word. A final output word is formed by concatenating a second i+j bit word consisting of an arrangement of the i+j bits from the first table output word and the second table output word which were not combined using the unbiased combining function, with the second w−i−j bit word such that if the first i+j bit word consisted of the i+j least significant bits of the third w-bit word, the second i+j bit word is concatenated to the leftmost end of the second w−i−j bit word and otherwise it is concatenated to the rightmost end of the w−i−j bit word.

Preferred implementations may include one or more of the following features.

The non-linear combiner has a first and a second lookup table, the first table output value is taken from the output of the first lookup table, and the second table output value is taken from the output of the second lookup table.

The non-linear combiner has only a single lookup table, the first table output value is taken from a first arrangement of the bits of the output of the lookup table, and the second table output value is taken from a second arrangement of the bits of the output of the lookup table.

The non-linear combiner has equal characteristic values a and b.

The non-linear combiner has equal characteristic values i and j.

The output of the unbiased combiner is an interleaving of its inputs.

The i bits of the first output table value which are not combined in the unbiased combiner form a permutation of the address range of the first lookup table, and the j bits of the second output table value which are not combined in the unbiased combiner form a permutation of the address range of the second lookup table.

Other features and advantages of the invention will become apparent from the following description of preferred embodiments, including the drawings, and from the claims.

Figure 2A:
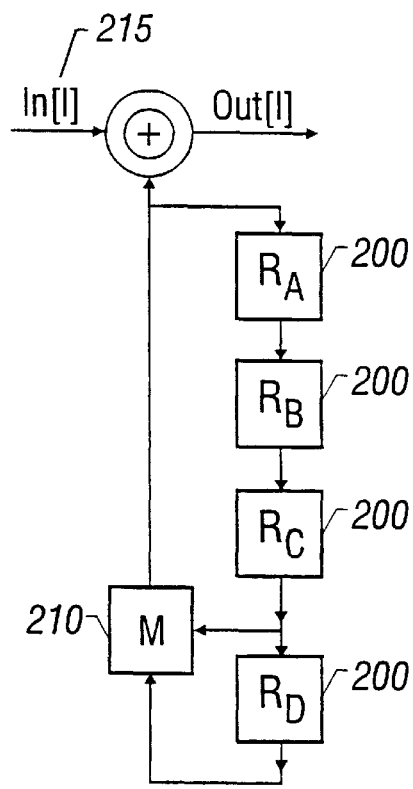
FIG. 2(a) is an operational flow diagram for a serially implemented pseudo-random number generator according to the present invention, capable of emulating the parallel implementation of the four-stage WAKE-ROFB pseudo-random number generator shown in FIG. 2(c).
Figure 2C:
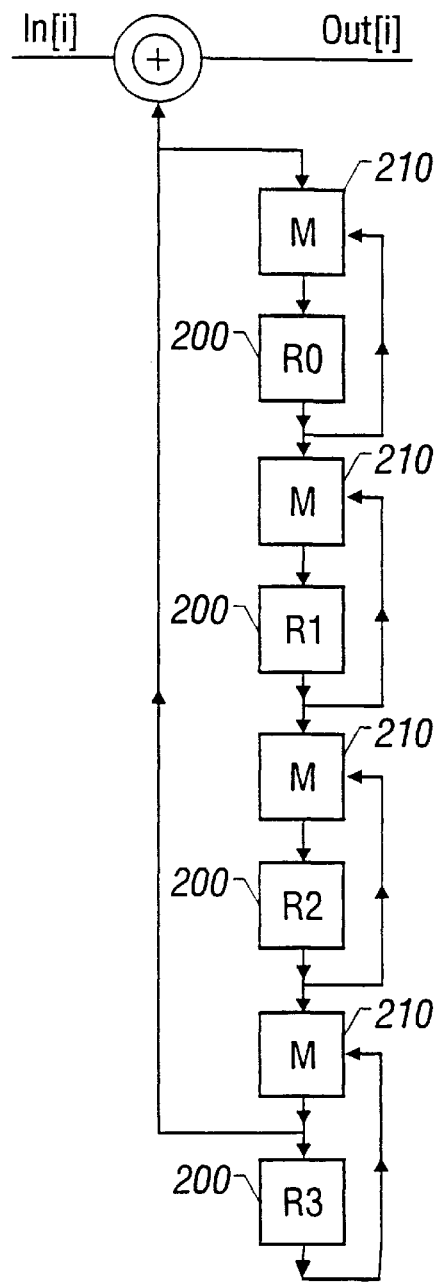
FIG. 2(b) is a table showing the correspondence over a series of time steps between the contents of the registers of the pseudo-random number generator shown if FIG. 2(a)

and the contents of the registers of the parallel implementation of the four-stage WAKE-ROFB pseudo-random number generator as shown in FIG. 2(c).

FIG. 2(c) is an operational flow diagram for a parallel implementation of the four-stage WAKE-ROFB pseudo-random number generator.

Figure 3A:
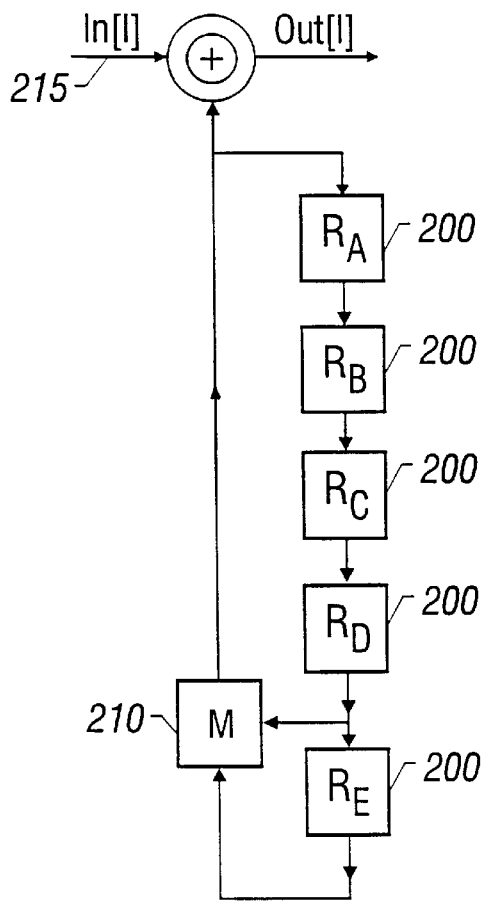
Figure 3C:
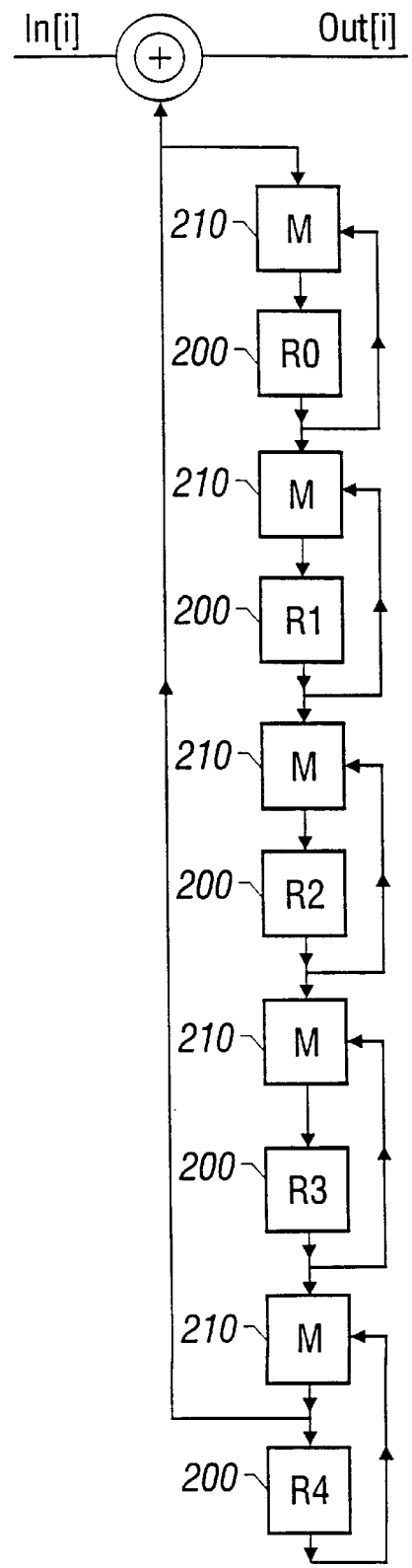

FIG. 3(a) is an operational flow diagram for a serially implemented pseudo-random number generator according to the present invention, capable of emulating the parallel implementation of the five-stage WAKE-ROFB pseudo-random number generator shown in FIG. 3(c).

FIG. 3(b) is a table showing the correspondence over a series of time steps between the contents of the registers of the pseudo-random number generator shown if FIG. 3(a) and the contents of the registers of the parallel implementation of the five-stage WAKE-ROFB pseudo-random number generator as shown in FIG. 3(c)

FIG. 3(c) is an operational flow diagram for a parallel implementation of the five-stage WAKE-ROFB pseudo-random number generator.

Figures 4A, 4C:
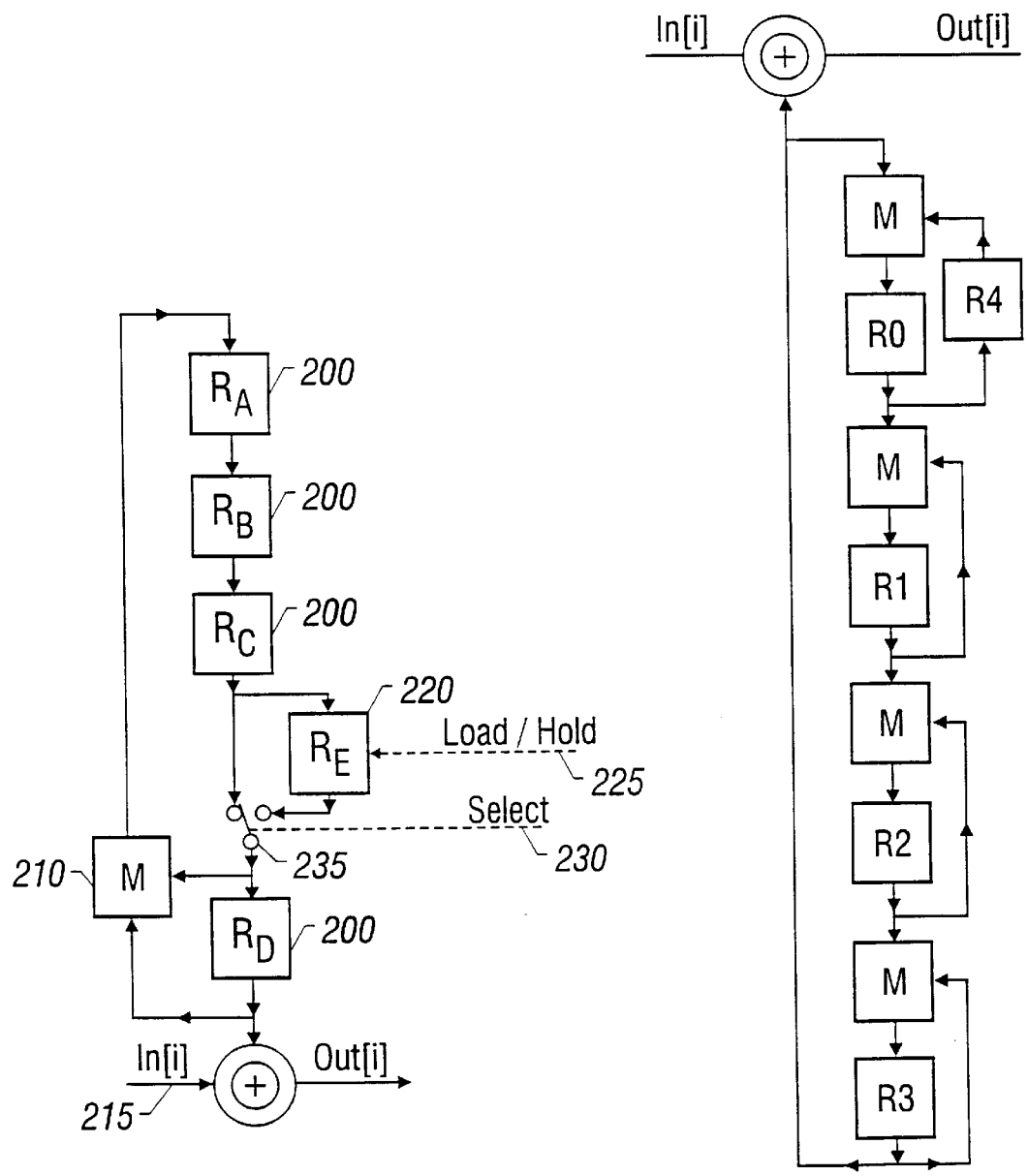

FIG. 4(a) is an operational flow diagram for a serially implemented pseudo-random number generator according to the present invention, capable of emulating the parallel implementation of the WiderWake pseudo-random number generator, having four stages and one two-register stage, shown in FIG. 4(c).

FIG. 4(b) is a table showing the correspondence over a series of time steps between the contents of the registers of the pseudo-random number generator shown if FIG. 4(a) and the contents of the registers of the parallel implementation of the WiderWake pseudo-random number generator having four stages and one two-register stage, shown in FIG. 4(c).

FIG. 4(c) is an operational flow diagram for a parallel implementation of the WiderWake pseudo-random number generator having four stages and one two-register stage.

Figure 5:
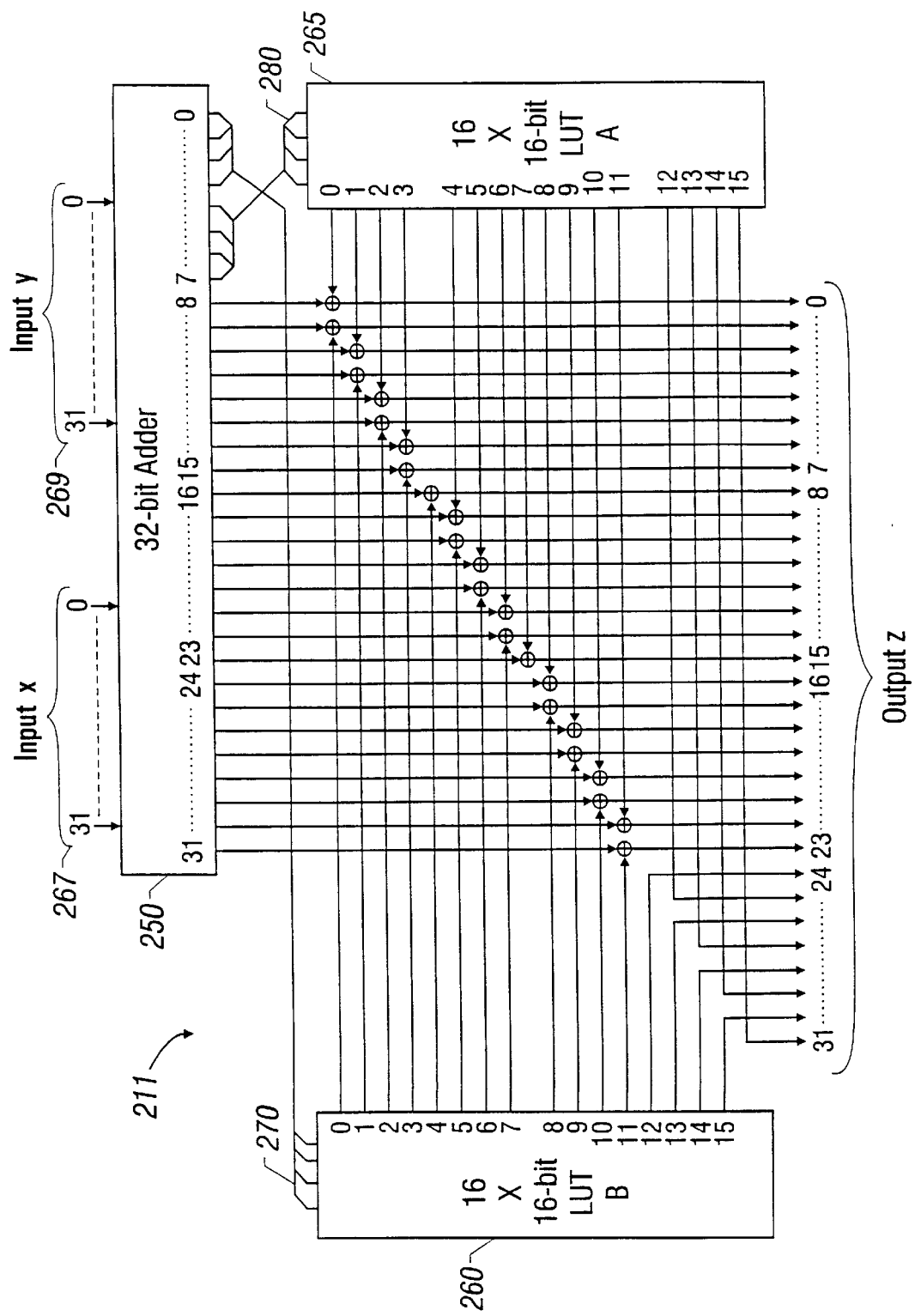

FIG. 5 shows a particular preferred embodiment of a non-linear combiner according to the present invention.

Figure 6:
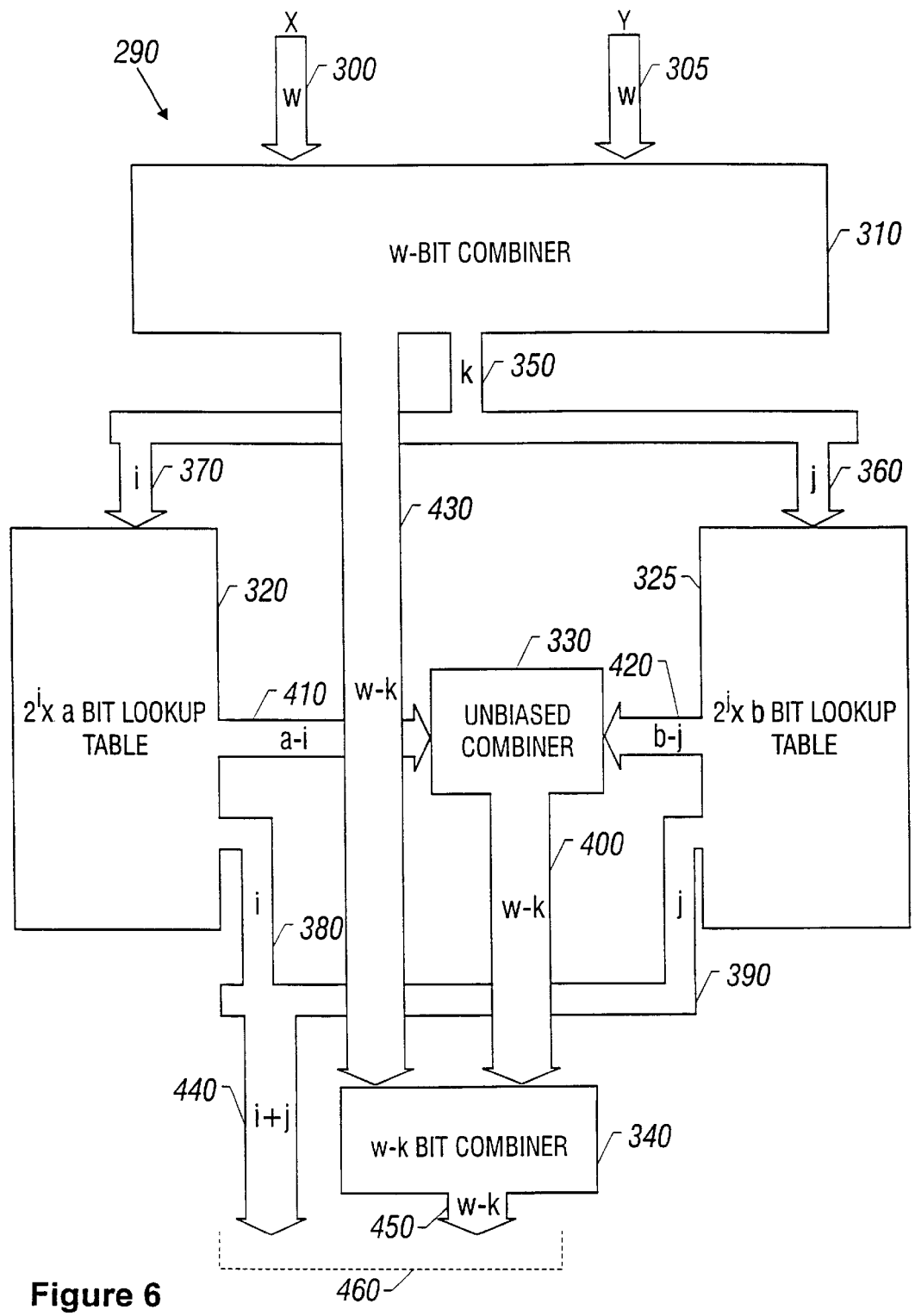

FIG. 6 is a schematic diagram of a non-linear combiner according to the present invention.

Figure 7:
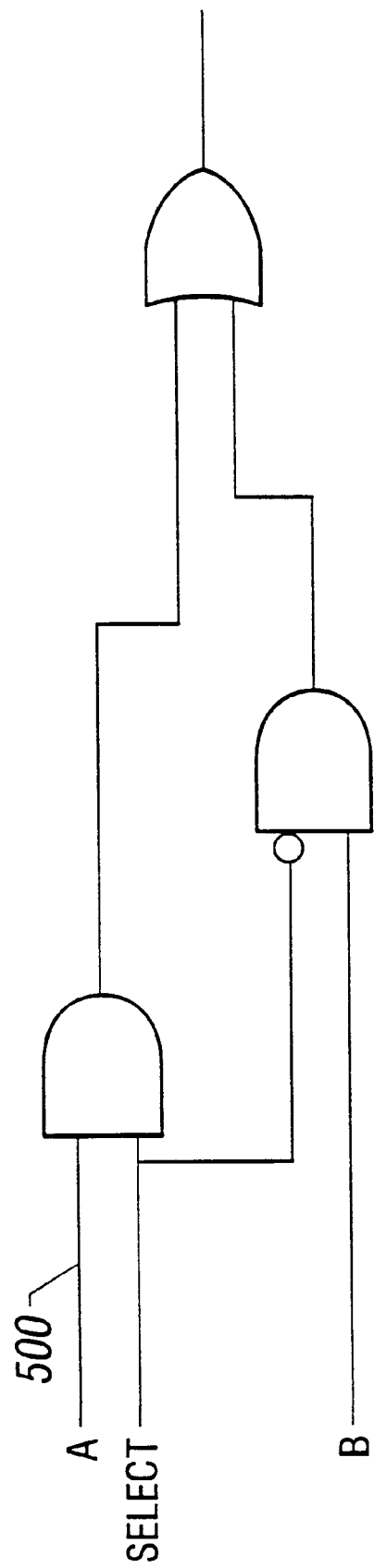

FIG. 7 is a pairwise selector circuit by which a single input bit selects the output from two other input bits.

Figure 8B:
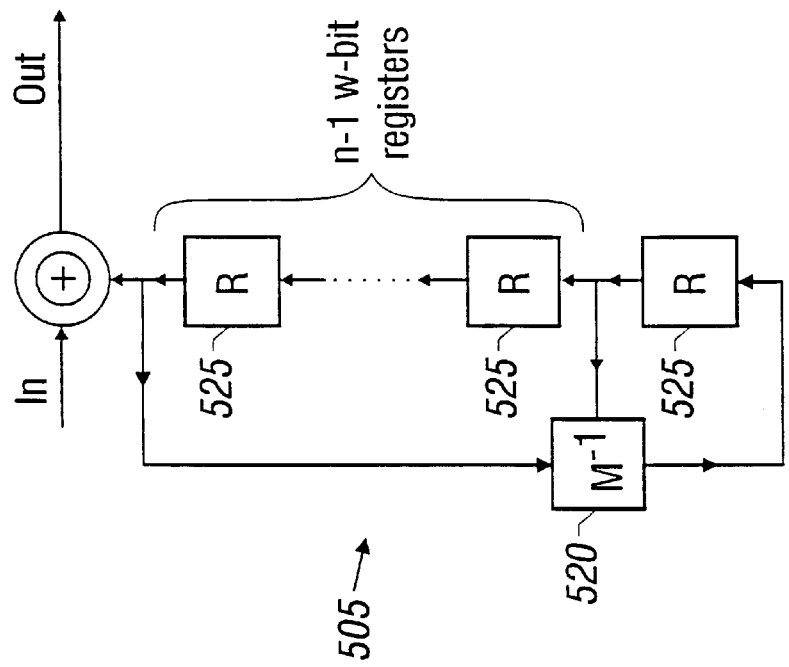
Figure 8A:
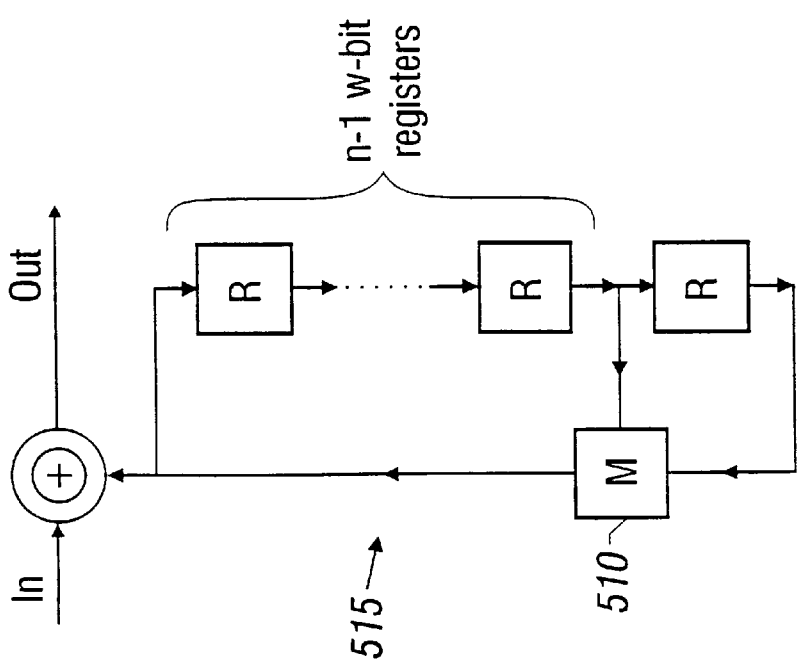

FIG. 8(a) shows the general form of the operational flow diagram of a serially implemented pseudo-random number generator capable of emulating an n-stage parallel implementation of the WAKE-ROFB pseudo-random number generator.

FIG. 8(b) shows the general form of the operational flow diagram of a serially implemented pseudo-random number generator capable of generating, in a steady state, the time-reversed output of the pseudo-random number generator shown in FIG. 8(a).

FIG. 9 a chart showing the performance characteristics of selected 32-bit variants of the WAKE-ROFB pseudo-random number generator.

FIG. 10a shows a variant of the pseudo-random number generator of FIG. 2(a) in which output is taken from a register.

FIG. 10b shows a variant of the pseudo-random number generator of FIG. 3(a) in which output is taken from a register.

Figure 10C:
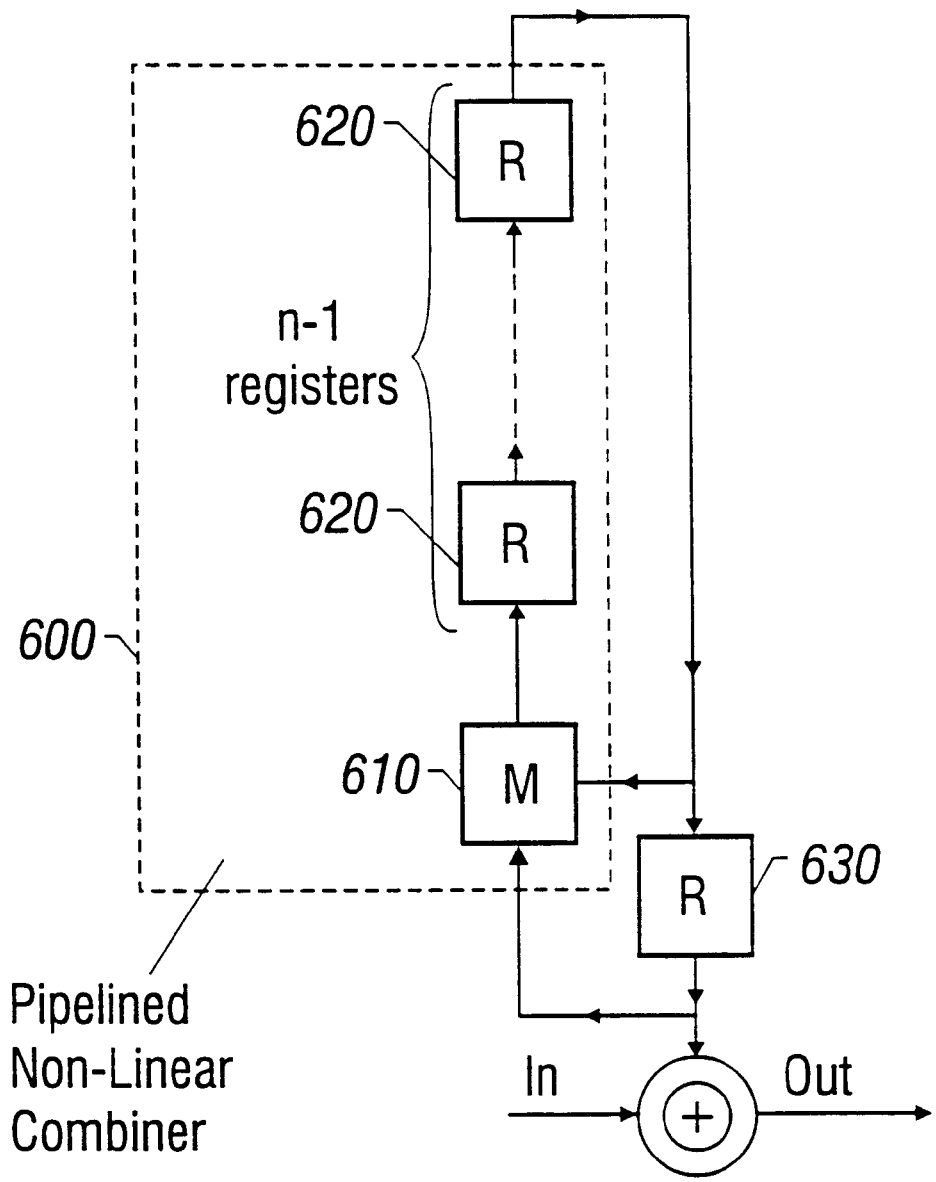

FIG. 10c is the general form of the operational flow diagram for a variant of WAKE-ROFB in which output is taken from a register, showing how certain elements can be combined in a pipelined non-linear combiner.

Figure 11:
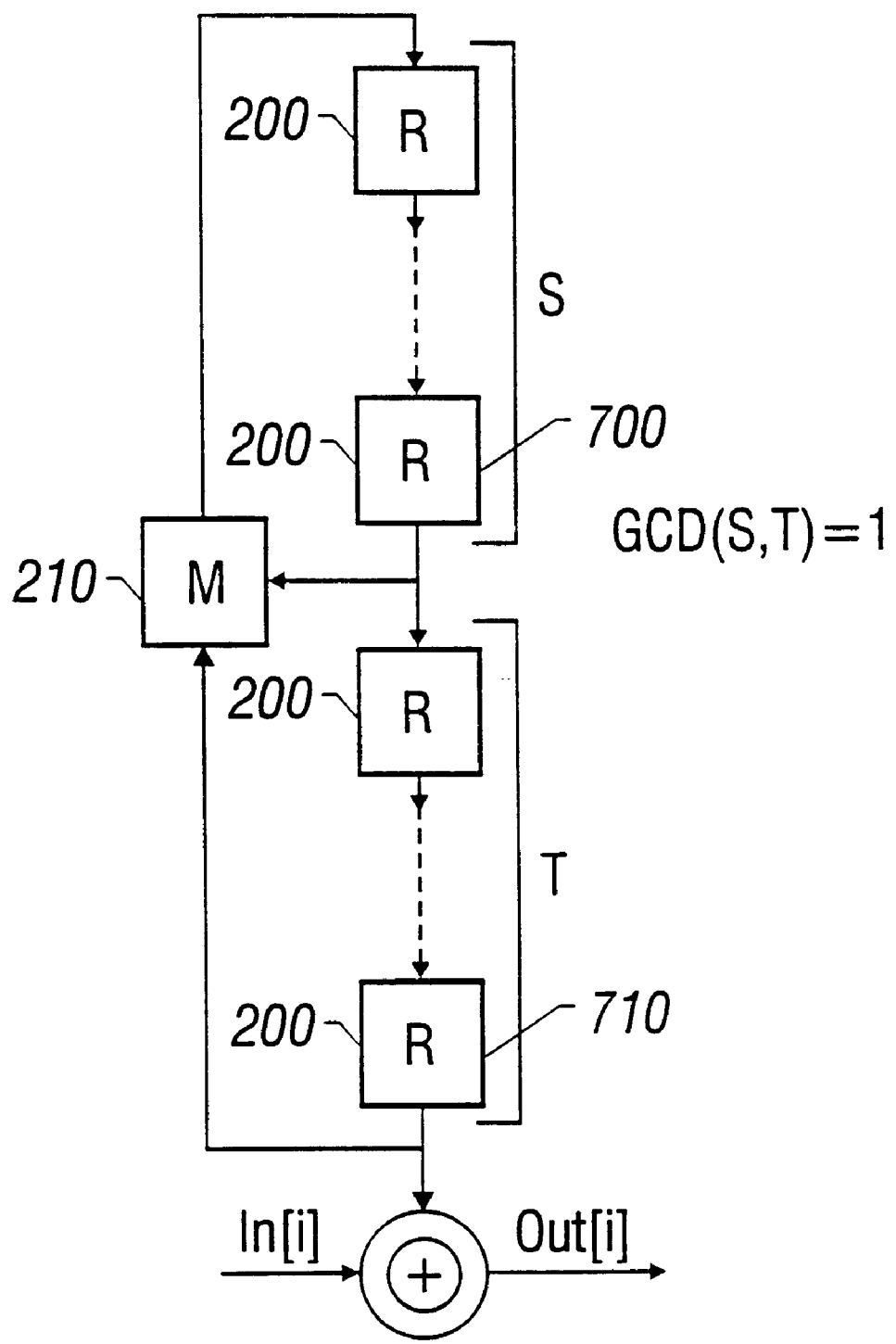

FIG. 11 shows the general form of the operational flow diagram for a particular embodiment of the present invention.

DESCRIPTION OF THE PREFERRED EMBODIMENTS

Figure 1A:
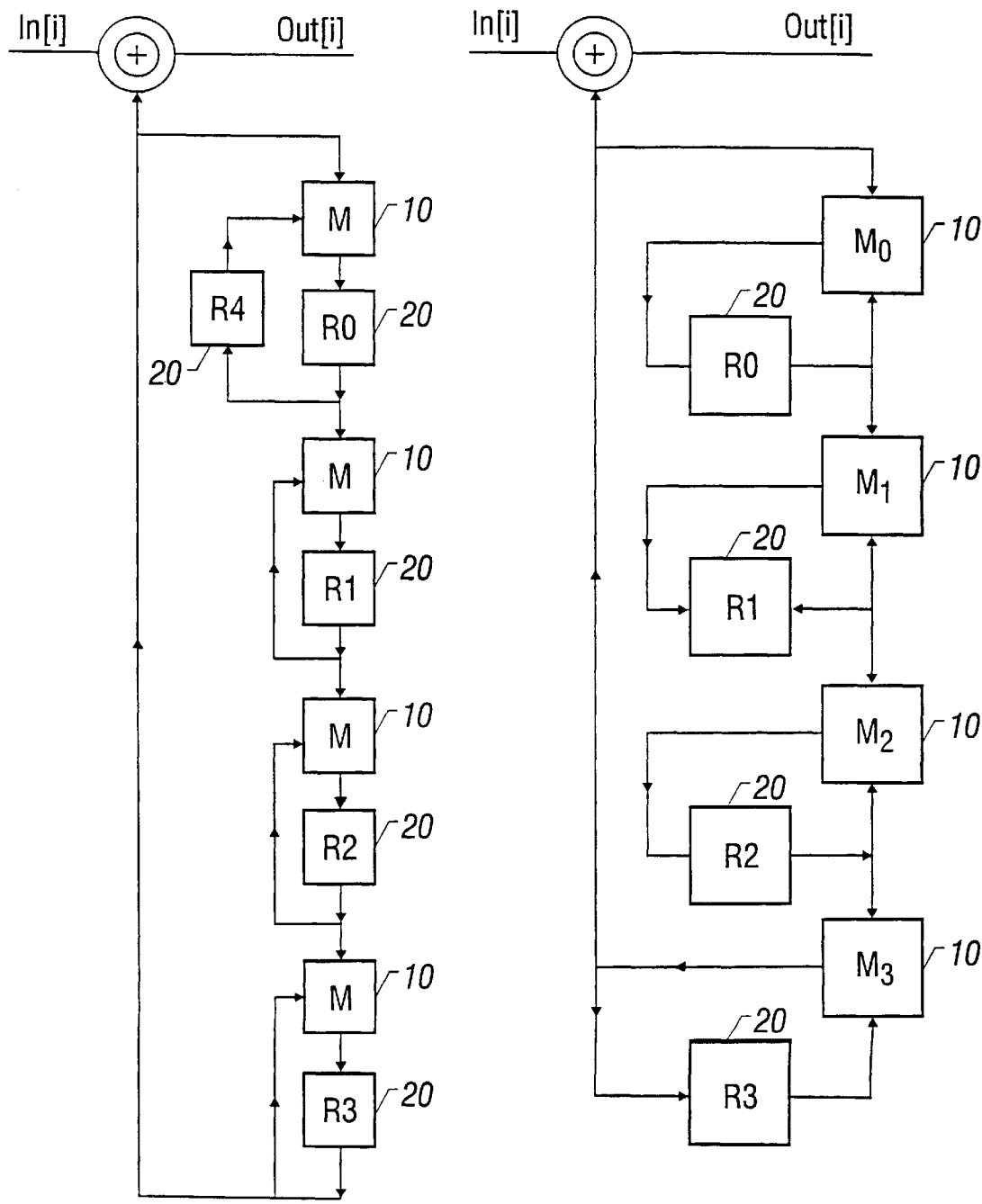
FIG. 1a shows operational flow diagrams for parallel software implementations of the WiderWake pseudo-random number generator with four stages and one two-register stage, and the four-stage WAKE-ROFB pseudo-random number generator.
Figure 1B:
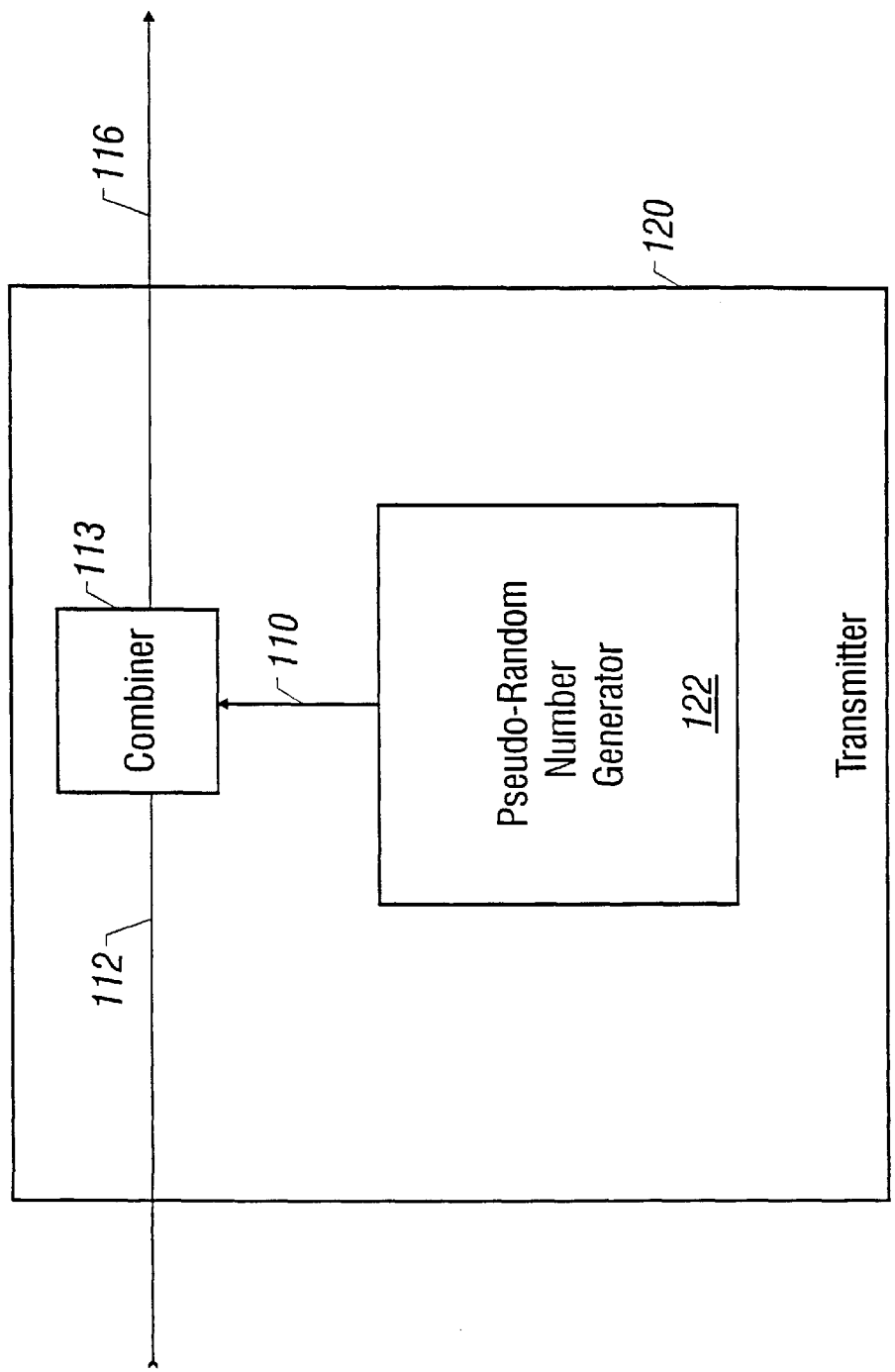
FIG. 1b is a block diagram of a transmitter capable of combining a stream generated by a pseudo-random number generator with an input stream of plaintext to create a stream of ciphertext for transmission to a decoder.

Referring to FIG. 1b, the invention, in one application, provides a pseudo-random bitstream, over a line 110, which can be combined with a datastream to be encoded over a line 112, for example, using an exclusive-OR operation in a combiner 113, to produce a resulting bitstream over a line 116 for transmission to a decoding receiver. The resulting transmitter 120 is particularly suited to efficient hardware implementations.

The pseudo-random number generator 122 of the invention is a finite state machine having, in the illustrated embodiments, two component types: a w-bit non-linear combiner and a plurality of w-bit registers. The non-linear combiner and the registers are connected together to create a data path subject to the topological constraints detailed below.

Referring to FIG. 2(a), a preferred particular embodiment of the present invention consists of four w-bit registers 200 and one w-bit non-linear combiner 210. Each of the registers Rb, Rc and Rd receives its input from registers Ra, Rb and Rc respectively. Register Ra receives its input from the non-linear combiner 210. The non-linear combiner 210 receives its input from Rc and Rd. The output of the generator is sub-sampled from the output of the non-linear combiner 210 on every fourth clock cycle, and XORed with datastream 215 to create an encrypted stream.

As illustrated in the chart in FIG. 2(b), the embodiment of FIG. 2(a) emulates in an efficient hardware implementation the output of a four-stage variant of the pseudo-random number generator referred to as WAKE-ROFB in my co-pending application (illustrated in FIG. 2(c)), while using one, rather than four non-linear combiners.

Referring to FIG. 3(a), another preferred particular embodiment of the present invention consists of five w-bit registers 200 and one w-bit non-linear combiner 210. Each of the registers Rb, Rc, Rd and RE receives its input from registers Ra, Rb, Rc and Rd respectively. Register Ra receives its input from the non-linear combiner 210. The non-linear combiner receives its input from Rd and Re. The output of the generator is sub-sampled from the output of non-linear combiner 210 on every fifth clock cycle and XORed with datastream 215 to create an encrypted stream.

As illustrated in the chart in FIG. 3(b), the embodiment of FIG. 3(a) emulates in an efficient hardware implementation the output of a five-stage variant of the pseudo-random number generator referred to as WAKE-ROFB in my co-pending application (illustrated in FIG. 3(c)), while using one, rather than five non-linear combiners.

As these examples illustrate, an n-stage variant of the WAKE-ROFB pseudo-random number generator can be implemented in hardware using only a single non-linear combiner and n registers, where all of the registers are in chained series, the non-linear combiner receives its inputs from the two final registers of the chained series, and the first register of the series receives its input from the non-linear combiner.

Referring to FIG. 4(a), another preferred particular embodiment of the present invention consists of four w-bit registers 200, a selectively loaded register 220, a non-linear combiner 210 and a selector 235. Registers Rb and Rc receive their input from register Ra and Rb respectively.

Selectively loaded register Re 220 receives its input selectively from register Rc, according to the state of a load/hold signal 225. Register Rd receives its input from selector 235, which provides the output of register Rc or Register Re, depending on the state of a select signal 230. The non-linear combiner 210 receives one input from register Rd, and its other input from the selector, which selects either register Rc or Register Re 220, depending on the state of select signal 230. On every fourth clock cycle, the load/hold signal is set to load and the select signal causes selector 235 to select the output of register Re, while on all other clock cycles the load/hold signal is set to hold, and the select signal causes selector 235 to select the output of register Rc. The output of the generator is sub-sampled from register Rd on every fourth clock cycle and the output is XORed with datastream 215 to create an encrypted stream. In alternative embodiments, the output of the generator may be sub-sampled from any of the other registers, or from the non-linear combiner, albeit with the need to readjust the correspondence between the output of the generator and the datastream to achieve a compatible and identical encipherment with that achieved by the generator illustrated in FIG. 4(c).

As illustrated in the chart in FIG. 4(b), the embodiment of FIG. 4(a) emulates the output of a four-stage variant of the pseudo-random number generator referred to in my co-pending application as WiderWake (illustrated in FIG. 4(c)), while using one, rather than four non-linear combiners.

In general, an n-stage variant of the WiderWake pseudo-random number generator, having a single two-register stage and n–1 single-register stages, can be implemented in hardware using only a single non-linear combiner and n registers, by adding or subtracting registers from the chained series Ra–Rc so that the total number of registers in the chained series equals n–1, and activating the load and select signals on every nth time step.

Referring now to FIG. 5, a particular preferred embodiment of a non-linear combiner 211 comprises a 32-bit adder 250, and two 16×16 bit lookup tables 260 and 265. The 32-bit adder takes as its input two 32-bit words 267 and 269 which are the inputs to the non-linear combiner 211, and produces a single 32-bit output which is sum of the two 32-bit words, modulo $2^{32}$. The four lowest order bits of the output of the adder 250 (that is, bits 0–3) provide an address 270 for 16×16 bit lookup table 260, while the next four lowest order bits of the output of the adder 250 (that is, bits 4–7) provide an address 280 for 16×16 bit lookup table 265. The remaining bits of the output of the adder 250 (that is, bits 8–31) are combined, using twenty-four two-input exclusive-or gates, with the output of the lookup tables 260 and 265, as follows: Adder output bits 8 and 9 are combined with output bit 0 of lookup table 265 and output bit 0 of lookup table 260, respectively, to produce bits 0 and 1, respectively, of the output of the non-linear combiner 211. Similarly, adder output bits 10 and 11 are combined with output bit 1 of lookup table 265 and output bit 1 of lookup table 260, respectively, to produce output bits 2 and 3, respectively, of the non-linear combiner 211. This alternating pattern continues for adder output bits 12–15, with each even output bit combined with an output bit from lookup table 265 and each odd output bit combined with an output bit from lookup table 260, to produce output bits 4–7 of the non-linear combiner 211. For output bits 16–23 of the adder, the pattern is reversed. Each even output bit of the adder is combined with an output bit from lookup table 260, and each odd output bit of the adder is combined with an output bit from lookup table 265, to produce output bits 8–15 of the non-linear combiner 211. For output bits 24–31 of the adder, the pattern is reversed again, with even adder output bits being combined with bits from lookup table 265 and odd adder output bits being combined with bits from lookup table 260, to produce output bits 16–23 of the non-linear combiner 211. The remaining output bits of the non-linear combiner 211 (that is, bits 24–31) are produced by interleaving the remaining output bits (that is, bits 12–15) of the lookup tables 265 and 260, as illustrated in FIG. 5. Bit 12 of lookup table 260 is written to output bit 24 of the non-linear combiner 211. This is followed by bit 12 of lookup table 265, bit 13 of lookup table 260, bit 13 of lookup table 265, and so forth.

In preferred embodiments of the invention, the state machine formed by the network of non-linear combiner and registers is reversible. That is, for every state of the machine there exists a unique previous state. This constraint serves to increase the expected cycle length in outputs of the machine.

In order to retain the reversibility of the state machine, the mixing function computed by the non-linear combiner must have a unique inverse. In other words, given the output and one input, it must be possible to uniquely determine the other input.

In order to invert the mixing function, it is sufficient to be able to discover, from the output of the non-linear combiner, the bits which formed the addresses to both of the non-linear combiner's lookup tables 260 and 265. This is accomplished in the preferred embodiment illustrated in FIG. 5 by configuring the non-linear combiner so that for each lookup table, there are as many output bits that are not XORed with adder output bits as there are address bits for that table and by requiring that the table values in these bits, taken as a group, form a pseudo-random permutation of the address range of the table. This means that each of the possible address values (e.g. 0–15 in the embodiment illustrated in FIG. 5) appears in exactly one table entry in these bits positions. Then, the state of these bits in each table output uniquely defines the address inputs to the tables.

The remaining bits in each lookup table entry may be filled with pseudo-random entries, as was done in the 256×32 bit lookup table described in my co-pending application. However, in a non-linear combiner with two 16×16 bit lookup tables, the likelihood that a table will contain a substantial statistical bias and thus lead to an undesirably large statistical bias in the output of the non-linear combiner is significantly greater than in a non-linear combiner using a single 256×32 bit table. For example, the probability of there being a table output bit whose value never changes (that is, is fixed at either zero or one independent of the address) is approximately $1-(1-2^{-15})^{24}$ or around $2^{-10}$ for the case of two 16×16-bit tables having pseudo-random entries in 24 of the 32 bit positions. By comparison, a 256×32-bit table with pseudo-random entries in 24 of the 32 bit positions has the vanishingly small probability of approximately $1-(1-2^{-255})^{24}$ or around $2^{-250}$ of this same unfortunate situation occurring.

To remedy this problem, in preferred embodiments the output bits of each table are grouped into groups of d bits, where d is the number of bits in the table's address space. For each such group of d bits, the table entries for those bits are made to be a pseudo-random permutation of the table's address range.

A randomly filled 256-entry lookup table will, with high probability, have output bit values whose non-linear order as a function of the address bits is 8. (That is, the values of each of the output bits will correspond to a boolean function of the address bits which, when written in algebraic normal form, contains a product of eight distinct boolean variables). However, the functions describing the output bit values from a 16-entry table cannot have non-linear order greater than 4. In order to as rapidly as possible regain the non-linear complexity of a mixing function based on a single randomly filled 256-entry lookup table, while incurring no additional hardware burden, preferred embodiments interleave the outputs of the two tables on a bit-by-bit basis, except that at k-bit boundaries (where k is the number of adder output bits used as lookup table address bits), the order is reversed. That is, when the outputs of the two lookup tables are formed back into the full-width word, the output of one table becomes the even numbered bits of the first k-bit group but the odd numbered bits of the next k-bit group, etc., while the output of the other table fills the remaining bits. This is illustrated in FIG. 5 for the case of w being 32 and k being 8.

Bit-by-bit interleaving creates an advantageous interaction between the two groups of bits when the output of the non-linear combiner reaches the adder as the input of the non-linear combiner at a subsequent iteration, since any carries generated inside the adder then act to mix bits that came from independent tables. The deviation from strict bit-by-bit interleaving is so that the XOR stage always combines output bits from one table with those bits in the output of the adder which have the highest correlation with the other table. This makes all resulting bits strongly dependent on both tables.

The most strongly non-linear operation in the non-linear combiner is the table lookup. The looked-up values are a non-linear function of the tables' address inputs. The k bits extracted to become the lookup table addresses could be arbitrarily assigned to the address bits of the two lookup tables without adversely affecting the performance of a software implementation having just one larger lookup table.

In a preferred embodiment, and referring to FIG. 5, the 8 bits extracted from the adder output are assigned to the address bits of the lookup tables as follows. The low order 4 contiguous bits are used to address lookup table 260. The high order 4 bits become the address for lookup table 265. In this way, each table's address is composed of a roughly even contribution from both tables in earlier operations. Of the two groups, the one containing bit 0 has a greater influence (from the prior iteration) from table 265 than from table 260 (because the possibility of table 260's output from the prior iteration influencing bit 0 by a carry is excluded) and thus by using bit 0 in table 260's address, the likelihood of bit 0 producing undesirable cycles in the state of the pseudo-random number generator is diminished.

The non-linear combiner illustrated in FIG. 5 is an instance of a more general class of hardware efficient non-linear combiners within the scope of the invention. FIG. 6 illustrates schematically the construction of a non-linear combiner 290 in this class. w-bit words x 300 and y 305 are inputs to combiner 310 with w bits of output. (In the embodiment illustrated in FIG. 5, w equals 32, but it may be set to any word length convenient for the particular application, such as a processor native word length). Combiner 310 implements an invertible functions which is preferably efficiently supported by processors on which the non-linear combiner 290 will be implemented. Examples of combiners which are suitable for commonly used processors are adders, subtractors, an array of two-input XOR gates, partitioned adders and partitioned subtractors. In a partitioned adder, there are one or more bit positions within the word for which the carry does not propagate. A partitioned subtractor is one in which at one or more bit positions within the word, the borrow does not propagate. In either case, a partition is a range of adjacent bits in which the carry or borrow does propagate. (In the embodiment illustrated in FIG. 5, the combiner 310 is an adder).

Lookup table 320 has $2^i$ entries having a bits each, while lookup table 325 has $2^j$ entries having b bits each. a plus b must be greater than or equal to w, a must be greater than or equal to i, and b must be greater than or equal to j. k contiguous bits 350 of the output of combiner 310 are used to address the lookup tables, where k is equal to i plus j. The k bits 350 must be the most or the least significant bits of the output of the combiner 310. (In the embodiment illustrated in FIG. 5, they are the least significant bits). Of these, i bits 370 address lookup table 320, while j bits 360 address lookup table 325. (In the embodiment illustrated in FIG. 5, i and j are equal to 4, a and b are equal to 16, and k is equal to 8. However, in general i, j, a and b may all be different, so long as the constraints identified above are satisfied.)

a minus i bits 410 of the output of table 320 and b minus j bits 420 of the output of table 325 are combined in unbiased combiner 330 to produce w−k bits of output 400. An unbiased combiner is one in which the likelihood that a given output bit will be zero or one is approximately equal over the range of possible inputs. Examples of unbiased combiners are an array of two-input XOR gates, an adders, and a subtractor. Other unbiased combiners permute or interleave the ordering of the input bits without changing their values. (In the embodiment illustrated in FIG. 5, the unbiased combiner 330 interleaves the input bits without changing their values).

w minus k output bits 400 of unbiased combiner 330 are combined in a combiner 340 with the w minus k bits 430 of the output of combiner 310 which are not among the k bits 350 used to address lookup tables 320 and 325. Combiner 340 implements an invertible function which is preferably efficiently supported by processors on which the non-linear combiner will be implemented, and which is not linear over the same domain as the function implemented by combiner 310.

Under this constraint, where one combiner is, for example, an array of two-input XOR gates, the other combiner may, for example, be an adder, a subtractor, a partitioned adder with equal size partitions or a partitioned subtractor with equal size partitions. However, if one of the combiners is an adder or a subtractor, the other combiner may not be, since adders and subtractors are linear over the same domain. This is so because an array of z two-input XOR gates implements a function which is linear over the domain of w-bit vectors modulo 2, while z-bit adders and subtractors both implement functions (addition and subtraction modulo $2^z$ respectively), which are linear over the domain of integers from 0 to $2^{z-1}$, and z-bit partitioned adders and subtractors with v equal size partitions implement functions which are linear over a domain of v-tuples modulo $2^{z/v}$. (In the embodiment illustrated in FIG. 5, combiner 310 is an adder and combiner 340 is an array of two-input XOR gates).

The output 460 of the non-linear combiner 290 is composed of the i bits 380 from the output of lookup table 320 which are not among the bits combined in unbiased combiner 330, the j bits 390 from the output of lookup table 325 which are not among the bits combined in unbiased combiner 330, and w minus k bits 450 which are the output of combiner 340. If the k bits 350 were taken from the least significant output bits of combiner 310, then an arrangement 440 of the i bits 380 and j bits 390 form the k most significant bits of the output 460 of non-linear combiner 290. Otherwise they form the k least significant bits of the output 460 of non-linear combiner 290. (In the embodiment illustrated in FIG. 5, the bits form the most significant bits of the output of the non-linear combiner, and they are arranged so as to be interleaved.)

In general, the entries of lookup tables 320 and 325 should be generated by a pseudo-random process. In table 320, the i bits of each entry which go to i output bits 380 should be filled with a pseudo-random permutation of the values from 0 to $2^{i-1}$, while in table 325, the j bits of each entry which go to j output bits 390 should be filled with a pseudo-random permutation of the values from 0 to $2^{j}-1$.

In an alternative embodiment, the combiner 310 can be moved to the bottom of the data path, and made to receive as one input, word 460, and as another input, word y 305. The output of the non-linear combiner 290 is thus read from the output of this repositioned combiner. Input word x 300 to the non-linear combiner is used instead of the output of unbiased combiner 310 to provide the i bits 370 of the address for lookup table 320, the j bits of address 360 for lookup table 325, and the w minus k bits which are combined in combiner 340.

In a particular alternative embodiment, a minus i is equal to twice b minus j, and b minus j equals w minus k. Referring to FIG. 6, in this alternative embodiment, in the unbiased combiner 330, each of the b–j bits 420 acts as a pairwise selector from a distinct pair of the a minus i bits 410 to produce w minus k bits of output. FIG. 7 illustrates a pairwise selector circuit 500 by which a single input bit selects the output from two other input bits.

It should be obvious to one skilled in the art that for implementations where a equals b and i equals j, the two lookup tables of FIG. 6 could be replaced by a single lookup table having double the number of entries, and where the i bits of address are used to select entries from the first half of the table, the j bits of address are used to select entries from the second half of the table, and appropriate buffers are used to permit combination of these two outputs.

In an alternative embodiment, however, a single table having only the number of entries as the larger of the tables in FIG. 6, and having outputs equal in size to the greater of a or b can be used. Two sets of output bits are selected from these same entries, first using the i bits of address and then using the j bits of address. To limit the amount of complexity lost through this change, the logical correspondence between the first set of output bits and the second set of output bits to output bits of the two tables in FIG. 6 may differ. For example, the bits from the first set corresponding to the i bits 380 from the output table 320 can be drawn from physically distinct table output bits from those bits corresponding to the j bits 390 from output table 325, so long as the i bit group values form a permutation of the range $0-2^{i}-1$ and the j bit group values form a permutation of the range $0-2^{j}-1$. This embodiment is particularly advantageous for hardware economy when a equals b and i equals j.

Referring now again to FIGS. 2(a) and 3(a), the 5-stage WAKE-ROFB generator has both greater parallelism and greater security than the 4-stage WAKE-ROFB generator. The greater parallelism arises from the reasons explained in my co-pending application. The greater security comes in part from the greater amount of hidden state that an attacker must deduce, and in part from the fact that there is one more non-linear combiner in the computational path that relates the current output to the previous one.

The increase in the computational path is best illustrated by reference to FIG. 8. FIG. 8(b) shows a generator 505 which produces output words in the reverse order of those produced by an n-stage WAKE-ROFB generator 515 which is illustrated in FIG. 8(a). Non-linear combiner $M^{-1}$ 520 implements the inverse function of non-linear combiner M 510, and receives its input from the first and the last of a chain of n registers 525. ($M^{-1}$ is guaranteed to exist because the non-linear combiner M 510 implements a mixing function which is, according to the preferred embodiment, invertible). The first register 525 in the chain receives its input from the output of the non-linear combiner $M^{-1}$ 520. Because generator 505 generates output words in the reverse order of those produced by generator 515, it has the same cryptographic strength. Moreover, it is clear that each output of the generator is influenced by the non-linear combiner at least once on every cycle, regardless of the number of registers in the upper register chain. Thus, in the case of an n-stage serial WAKE-ROFB generator, which takes its output from every nth cycle, the computational flowgraph from one output to the previous one must include a path having the previous output passing through n iterations of the non-linear mixing function.

From the hardware perspective, however, a disadvantage of a WAKE-ROFB generator with a greater number of stages over one with fewer stages is its need for additional w-bit registers. Thus, in an alternative embodiment of the present invention, the output of the generator illustrated in FIG. 8(a) is sub-sampled by a factor other than the number of registers in the generator. The sub-sampling rate is preferably chosen to be no less than the number of iterations of the mixing function required to achieve complete diffusion of its output bits.

The use of an increased sub-sampling rate may be preferred where additional cryptographic strength is desired but where a related software implementation cannot in any case take advantage of the additional parallelism given by a WAKE-ROFB generator with a greater number of registers. Varying the sub-sampling ratio in this manner allows a more flexible tradeoff between hardware and software efficiency, and allows the total amount of state and the number of mixing functions in the computational path between outputs to be independently chosen as security parameters of the overall design.

The table shown in FIG. 9 shows the performance characteristics of some selected variants of 32-bit WAKE-ROFB using a non-linear mixing function needing a minimum of four iterations to achieve 32-bits of diffusion. The tabulated software performance is normalized to that of a standard 4-stage WAKE-ROFB generator running on a CPU not having any instruction-level parallelism.

In my co-pending application, I provide pseudo-random number generators which exhibit instruction-level parallelism, including WAKE-ROFB and WiderWake. A notable advantage that this parallelism affords hardware implementations is the ability to pipeline the non-linear combiner and thereby increase the maximum clock rate at which such implementations can operate.

Pipelining is a technique well known in the art of digital electronic design for increasing the maximum attainable clock rate of a system. The maximum clock rate of a system is commonly set by the longest propagation path through combinational logic between any two registers. If a circuit topology allows additional registers to be placed in these long paths then the attainable clock rate can be increased.

Since the output of the non-linear combiner in the WAKE-ROFB variant of the present invention propagates along the chain of registers, it is clear that the output of any of those registers is a suitable node to tap for pseudo-random output, albeit with the need to readjust the correspondence between the output of the generator and the datastream to achieve a compatible and identical encipherment with that achieved by the generator illustrated in FIG. 8(a).

FIGS. 10a and 10b illustrate WAKE-ROFB variants in which the output is read from register 700, rather than from the non-linear combiner.

FIG. 10c illustrates how a pipelined version of n-stage WAKE-ROFB can be constructed. A pipelined unit 600 implements a non-linear combiner 610 and n−1 registers 620. A single additional register 630 provides the output of the generator.

It can be seen schematically that all but one of the registers are in chained series with the non-linear combiner output. Thus, the non-linear combiner can incorporate this number of pipeline stages while maintaining the exact pseudo-random sequence of the original circuit. The best positions for these registers if moved inside the non-linear combiner is dependent on the specific propagation delays through its various paths and can be determined by techniques well known to those skilled in the art of digital circuit design. It should be noted that speed-optimized positioning of the pipeline registers may place them at computational wavefronts crossed by more than w signals, each of which must be registered. So, the increase in speed due to pipelining may come at the cost of some increase in register bits.

For the generator topologies within the present invention, it will be obvious to one practiced in the field of pipelined digital circuit design that the maximum number of pipeline stages into which the non-linear combiner can be divided is exactly the number of mixing functions that can be simultaneously evaluated in the equivalent parallel implementation.

Further, any of the w-bit components of the present invention can be implemented using datapaths of less than w bits, and by serializing the operations appropriately.

FIG. 11 illustrates an alternative embodiment of the non-linear combiner of the invention. S+T registers 200 are arranged in chained series, such that the greatest common denominator of S and T is one. The non-linear combiner 210 receives its input from the Sth register 700 in the chained series, and from the (S+T)th register 710 in the chained series. In the particular alternative embodiment illustrated in FIG. 11, the output of the non-linear combiner is taken from the (S+T)th register 710 in the chained series, however, as explained above, output may be taken from any of the registers 200, or from the non-linear combiner 210.

What is claimed is:

1. A non-linear combining method for combining a first and a second w-bit words having characteristic non-zero integral values i, j, a, b, and w, where a+b=w, and a>=i and b>=j, and comprising the steps of:

combining the first and second w-bit words into a third w-bit word using a first invertible function;

generating a first table output word and a second table output word, having lengths a and b respectively, by looking up lookup table entries using a first i+j bit word consisting of the i+j least or most significant bits of the third w-bit word, so that i bits of the first i+j bit word are used to look up the first table output word and j distinct bits of the first i+j bit word are used to look up the second table output word;

combining with an unbiased combining function a−i bits of the first table output word and b−j bits of the second table output word to produce a first w−i−j bit word;

combining the first w−i−j bit word with the w−i−j bits of the third w-bit word not used to look up table output words, using a second invertible function, to produce a second w−i−j bit word;

forming a final output word by concatenating a second i+j bit word consisting of an arrangement of the i+j bits from the first table output word and the second table output word which were not combined using the unbiased combining function, with the second w−i−j bit word such that if the first i+j bit word consisted of the i+j least significant bits of the third w-bit word, the second i+j bit word, forms the most significant bits of the final output word and otherwise it forms the least significant bits of the final output word.

2. The method of claim 1, wherein the second invertible function is not linear over the same domain as the first invertible function.

3. The method of claim 1, wherein the step of generating a first table output word and a second table output word comprises:

generating a first table output word by using i bits of the first i+j bit word as an index into a first lookup table having at least $2^i$ entries of at least a bits each, and generating a second table output word by using j distinct bits of the first i+j bit word as an index into a second lookup table having at least $2^j$ entries of at least b bits each.

4. The method of claim 1. wherein a=b.

5. The method of claim 1, wherein i=j.

6. The method of claim 1, wherein the unbiased combining function produces a rearrangement of the bits of its inputs.

7. The method of claim 1, wherein the lookup table entries are configured so that over the range of possible values of the first output table value and the second output table value, the i bits of the first output table values which are not combined with the unbiased combining function form a permutation of the range 0 to $2^i-1$, the remaining bits of the first output table values are set according to a pseudo-random process, the j bits of the second output table values which are not combined with the unbiased combining function form a permutation of the range 0 to $2^j-1$, and the remaining bits of the second output table values are set according to a pseudo-random process.

8. The method of claim 1, wherein the first invertible function is not linear over the same domain as the second invertible function.

9. The method of claim 1, wherein the step of generating a first table output word and a second table output word comprises:

selecting the first output table value from a lookup table having at least the greater of $2^i$ and $2^j$ entries, each having the greater of a and b bits, according to the value of i bits of the first i+j bit word; and selecting as the second output table value a rearrangement of the bits of a value selected from the same lookup table according to the value of j distinct bits of the first i+j bit word.

10. The method of claim 1, wherein one of the invertible functions is addition and the other invertible function is bitwise exclusive-or.

11. A non-linear combiner having characteristic positive integral values w, i, j, a, and b, where a+b=w, and a>=i and b>=j, having a first and a second w-bit input and a w-bit output, and comprising a set of one or more lookup tables, each having an address input and an output, a first combiner having two w-bit inputs and one w-bit output and implementing an invertible function, a second combiner having two w−i−j bit inputs and one w−i−j bit output and implementing an invertible function, and an unbiased combiner having an a−i bit input and a b−j bit input and a w−i−j bit output, such that (a) at least one lookup table is capable of receiving at least the greater of i and j bits in its input address and has at least the greater of $2^i$ and $2^j$ entries;

(b) at least one lookup table has entries having the greater of a and b bits;

(c) the lookup table or tables in the set of one or more lookup tables are operatively connected to receive as address inputs the i+j least or most significant bits of first w-bit input;

(d) the set of one or more lookup tables are configured to produce as outputs a first table output value according to the value of i bits of the i+j bits received as the address inputs of the lookup tables and a second table output value according to the value of j bits of those i+j bits;

(e) the unbiased combiner is operatively connected to receive as a first input a−i bits of the first table output value and to receive as a second input b−j bits of the second table output value;

(f) the second combiner is operatively connected to receive as inputs the output of the unbiased combiner and the w−i−j bits from first w-bit input which are not operatively connected to the address input or inputs of the lookup tables;

(g) the first combiner is operatively connected to receive as its first input the second w-bit input to the non-linear combiner, and to receive, as either the i+j least or i+j most significant bits of its second input, an arrangement of the i output table bits from the first table output value and the j output table bits from the second table output value which are not operatively connected to be received by the unbiased combiner, such that if the most significant bits of the output of the first w-bit input to the non-linear combiner are operatively connected to the address input or inputs of the lookup tables, the first combiner is operatively connected to receive the arrangement as the least significant bits of its second input, and otherwise the first combiner is operatively connected to receive the arrangement as the most significant bits of its second input; and (i) the first combiner is operatively connected to receive the remaining bits of its second input from the output bits of the second combiner.

12. The non-linear combiner of claim 11, wherein the set of one or more lookup tables comprises a first and a second lookup table, the address input of the first lookup table is operatively connected to receive i bits of the i+j bits operatively connected to the address inputs of the lookup tables, the address input of the second lookup table is operatively connected to receive j bits of the i+j bits, the first table output value is the output of the first lookup table, and the second table output value the output of the second lookup table.

13. The non-linear combiner of claim 11, wherein the output of the unbiased combiner is a rearrangement of the bits of its inputs.

14. The non-linear combiner of claim 11, wherein the set of one or more lookup tables is configured so that over the range of possible values of the first output table value and the second output table value, the i bits of the first output table values which are not operatively connected to be received on the unbiased combiner form a pseudo-random permutation of the range 0 to $2^i-1$, the remaining bits of the first output table values are set according to a pseudo-random process, the j bits of the second output table value which are not operatively connected to be received in the unbiased combiner form a pseudo-random permutation of the range 0 to $2^j-1$, and the remaining bits of the second output table values are set according to a pseudo-random process.

15. The non-linear combiner of claim 11, wherein the function implemented by the first combiner is not linear over the same domain as the function implemented by the second combiner.

16. The non-linear combiner of claim 11 wherein the set of one or more lookup tables consists of a single lookup table, and further comprising:

(a) means for selecting the first output table value from the lookup table according to the value of i bits of the i+j bits operatively connected to the address input of the lookup table;

(b) means for selecting the second output table value from the lookup table according to the value of j bits of the i+j bits operatively connected to the address input of the lookup table, such means including means for permuting the bits of the output of the lookup table;

(c) means for simultaneously operatively connecting a−i bits of the first table output value to the first input of the unbiased combiner and operatively connecting the b−j bits of the second table output value to the second input of the unbiased combiner; and (d) means for simultaneously applying the remaining bits of the first output table value and the remaining bits of the second output table value to the form the i+j least or most significant bits of the output of the non-linear combiner.

17. The non-linear combiner of claim 11, wherein one of the first and second combiners is an adder and the other is a bitwise exclusive-or.

18. A non-linear combining method for combining a first and a second w-bit words having characteristic non-zero integral values i, j, a, b, and w, where a+b=w, and a>=i and b>=j, and comprising the steps of:

generating a first table output word and a second table output word, having lengths a and b respectively, by looking up lookup table entries using a first i+j bit word consisting of the i+j least or most significant bits of the first w-bit word, so that i bits of the first i+j bit word are used to look up the first table output word and j distinct bits of the first i+j bit word are used to look up the second table output word;

combining with an unbiased combining function a−i bits of the first table output word and b−j bits of the second table output word to produce a first w−i−j bit word;

combining the first w−i−j bit word with the w−i−j bits of the first w-bit word not used to look up table output words, using a second invertible function, to produce a second w−i−j bit word;

forming a first intermediate value by concatenating a second i+j bit word consisting of an arrangement of the i+j bits from the first table output word and the second table output word which were not combined using the unbiased combining function, with the second w−i−j bit word such that if the first i+j bit word consisted of the i+j least significant bits of the first w-bit word, the second i+j bit word forms the most significant bits of the first intermediate value and otherwise it forms the least significant bits of the first intermediate value; and forming a final output word by combining the first intermediate value and the second w-bit word into a third w-bit word using a first invertible function.

19. The method of claim 18, wherein the second invertible function is not linear over the same domain as the first invertible function.

20. The method of claim 18, wherein the step of generating a first table output word and a second table output word comprises:

generating a first table output word by using i bits of the first i+j bit word as an index into a first lookup table having at least $2^i$ entries of at least a bits each, and generating a second table output word by using j distinct bits of the first i+j bit word as an index into a second lookup table having at least $2^j$ entries of at least b bits each.

21. The method of claim 18, wherein a=b.

22. The method of claim 18, wherein i=j.

23. The method of claim 18, wherein the unbiased combining function produces a rearrangement of the bits of its inputs.

24. The method of claim 18, wherein the lookup table entries are configured so that over the range of possible values of the first output table value and the second output table value, the i bits of the first output table values which are not combined with the unbiased combining function form a permutation of the range 0 to $2^i-1$, the remaining bits of the first output table values are set according to a pseudo-random process, the j bits of the second output table values which are not combined with the unbiased combining function form a permutation of the range 0 to $2^j-1$, and the remaining bits of the second output table values are set according to a pseudo-random process.

25. The method of claim 18, wherein the first invertible function is not linear over the same domain as the second invertible function.

26. The method of claim 18, wherein the step of generating a first table output word and a second table output word comprises:

selecting the first output table value from a lookup table having at least the greater of $2^i$ and $2^j$ entries, each having the greater of a and b bits, according to the value of i bits of the first i+j bit word; and selecting as the second output table value a rearrangement of the bits of a value selected from the same lookup table according to the value of j distinct bits of the first i+j bit word.

27. The method of claim 18, wherein one of the invertible functions is addition and the other invertible function is bitwise exclusive-or.

28. A non-linear combiner having characteristic positive integral values w, i, j, a, and b, where a+b=w, and a>=i and b>=j, having a first and a second w-bit input and w-bit output, and comprising a set of one or more lookup tables, each having an address input and an output, a first combiner having two w-bit inputs and one w-bit output and implementing an invertible function, a second combiner having two w−i−j bit inputs and one w−i−j bit output and implementing an invertible function, and an unbiased combiner having an a−i bit input and a b−j bit input and a w−i−j bit output, such that (a) at least one lookup table is capable of receiving at least the greater of i and j bits in its input address and having at least the greater of $2^i$ and $2^j$ entries;

(b) at least one lookup table has entries having the greater of a and b bits;

(c) the first combiner is operatively connected to receive as input the first and the second w-bit inputs to the non-linear combiner;

(d) the lookup table or tables in the set of one or more lookup tables are operatively connected to receive as address inputs the i+j least or most significant bits of the output of the first combiner;

(e) the set of one or more lookup tables are configured to produce as outputs a first table output value according to the value of i bits of the i+j bits received as the address inputs of the lookup tables and a second table output value according to the value of j bits of those i+j bits;

(f) the unbiased combiner is operatively connected to receive as a first input a−i bits of the first table output value and to receive as a second input b−j bits of the second table output value;

(q) the second combiner is operatively connected to receive as inputs the output of the unbiased combiner and w−i−j bits from the output of the first combiner which are not operatively connected to the address input or inputs of the lookup tables;

(h) an arrangement of the i output table bits from the first table output value and the j output table bits from the second table output value which are not operatively connected to be received by the unbiased combiner, form either the i+j least or i+j most significant bits of the output of the non-linear combiner, such that if the most significant bits of the output of the first combiner are operatively connected to the address input or inputs of the lookup tables, the arrangement forms the least significant bits of the output of the non-linear combiner, and otherwise they form the most significant bits of the output of the non-linear combiner; and (i) the remaining output bits of the non-linear combiner are formed by the output bits of the second combiner.

29. The non-linear combiner of claim 28, wherein the set of one or more lookup tables comprises a first and a second lookup table, the address input of the first lookup table is operatively connected to receive i bits of the i+j bits operatively connected to the address inputs of the lookup tables, the address input of the second lookup table is operatively connected to receive j bits of the i+j bits, the first table output value is the output of the first lookup table, and the second table output value the output of the second lookup table.

30. The non-linear combiner of claim 28, wherein a=b.

31. The non-linear combiner of claim 28, wherein i=j.

32. The non-linear combiner of claim 28, wherein the output of the unbiased combiner is a rearrangement of the bits of its inputs.

33. The non-linear combiner of claim 28, wherein the set of one or more lookup tables is configured so that over the range of possible values of the first output table value and the second output table value, the i bits of the first output table values which are not operatively connected to be received in the unbiased combiner form a Pseudo-random permutation of the range 0 to $2^i-1$, the remaining bits of the first output table values are set according to a pseudo-random process, the j bits of the second output table values which are not operatively connected to be received in the unbiased combiner form a pseudo-random permutation of the range 0 to $2^j-1$, and the remaining bits of the second output table values are set according to a pseudo-random process.

34. The non-linear combiner of claim 28, wherein the function implemented by the first combiner is not linear over the same domain as the function implemented by the second combiner.

35. The non-linear combiner of claim 28, wherein the set of one or more lookup tables consists of a single lookup table, and further comprising:

(a) means for selecting the first output table value from the lookup table according to the value of i bits of the i+j bits operatively connected to the address input of the lookup table;

(b) means for selecting the second output table value from the lookup table according to the value of j bits of the i+j bits operatively connected to the address input of the lookup table, such means including means for permuting the bits of the output of the lookup table;

(c) means for simultaneously operatively connecting a−i bits of the first table output value to the first input of the unbiased combiner and operatively connecting the b−j bits of the second table output value to the second input of the unbiased combiner; and (d) means for simultaneously applying the remaining bits of the first table output value and the remaining bits of the second table output value to the form the i+j least or most significant bits of the output of the non-linear combiner.

36. The non-linear combiner of claim 28 wherein one of the first and second combiners is an adder and the other is a bitwise exclusive-or.

* * * * *